United States Patent Office 3,332,955
Patented July 25, 1967

3,332,955
N-PERCHLORYL PIPERIDINE
Charles J. Mackley, Philadelphia, Pa., assignor to Pennsalt Chemicals Corporation, Philadelphia, Pa., a corporation of Pennsylvania
No Drawing. Filed Feb. 27, 1964, Ser. No. 347,698
2 Claims. (Cl. 260—293)

This invention relates to a new composition of matter, N-perchloryl piperidine, and to its preparation.

It is known to perchlorylate benzene and simple benzene derivatives with perchloryl fluoride using aluminum trichloride as promoter (Inman et al., J.A.C.S. 80, 5286 (1958), and Gardner et al., Journal of Organic Chemistry, 28, 2650 (1963)). However, no aromatic system other than the benzene ring has been perchlorylated to date and no perchloryl derivatives of any heterocyclic compounds have been prepared.

We have found that anhydrous piperidine reacts explosively when contacted with a stream of $ClO_3F$ gas. The violence of the reaction can be moderated either by passing the perchloryl fluoride gas at a very slow rate or by diluting the gas with large amounts of inert gas such as nitrogen, but in either case, uncontrolled oxidation occurs and a complex mixture of products is obtained. Infrared analysis of the mixture indicates that the products are the result of piperidine ring cleavage.

We have found, in accord with this invention, that N-perchloryl piperidine may be obtained by contacting an aqueous piperidine solution with gaseous perchloryl fluoride. As reaction occurs an oil separates from the solution and upon extraction of the oil with a solvent (such as ether) and subsequent evaporation of the solvent, the product obtained as N-perchloryl piperidine.

The reaction for the process of this invention is illustrated by the following equation:

$$2C_5H_{10}NH + ClO_3F \rightarrow C_5H_{10}NClO_3 + C_5H_{10}NH_2F$$

N-perchloryl piperidine is a dangerously sensitive material which explodes on heating or on contact with a drop of free piperidine. It can be desensitized somewhat by absorbing it on aluminum powder. Thus, N-perchloryl piperidine is useful as an explosive and is particularly useful as an explosive primer. The index of refraction for N-perchloryl piperidine is 1.4646 for a freshly prepared sample and its oxidation equivalent was found to be 37.2 milli-equivalents per gram.

The preparation of N-perchloryl piperidine is illustrated by the following example:

Eight grams of piperidine was dissolved in 240 ml. of water. Perchloryl fluoride was bubbled through a gas dispersion tube below the surface of the stirred solution. An oil immediately separated from the solution and after 10 minutes the pH of the solution was still alkaline due to the presence of unreacted piperidine. The mixture at this point was extracted with diethyl ether and the ether extract was washed with 10% HCl and the ether then evaporated under vacuum.

An oily product weighing 5.2 g. was isolated which represents 66% yield based on the piperidine used. Infrared, mass spectral and elemental analysis support the identification of the compound as N-perchloryl piperidine having the structure

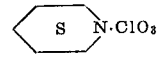

Elemental analysis was as follows:
Found: C=37.6%; H=6.6%; N=7.9%; Cl=18.7%.
Calculated: C=35.8%; H=6.0%; N=8.4% Cl=21.2%.

Additional evidence for the structure resides in the mass cracking pattern of a freshly prepared sample:

| Mass of Ion Found (m./e.) | Corresponding Ion |
|---|---|
| 167, 169 | $\langle S \rangle NClO_3^+$ |
| 84 | $\langle S \rangle N^+$ |
| 83, 85 | $ClO_3^+$ |
| 67, 69 | $ClO_2^+$ |

It will be understood that numerous changes and modifications may be made from the above description and examples without departing from the spirit and scope of the invention.

I claim:
1. N-perchloryl piperidine.
2. The process of preparing N-perchloryl piperidine which comprises contacting an aqueous solution of piperidine with perchloryl fluoride.

No references cited.

WALTER A. MODANCE, Primary Examiner.
AVROM D. SPEVACK, Assistant Examiner.